United States Patent [19]

DiMartino

[11] 4,436,461

[45] Mar. 13, 1984

[54] METHOD AND APPARATUS FOR FABRICATING FUSION REACTOR COILS

[75] Inventor: Michelangelo DiMartino, San Diego, Calif.

[73] Assignee: Burt Precision Products, Inc., San Diego, Calif.

[21] Appl. No.: 270,236

[22] Filed: Jun. 4, 1981

[51] Int. Cl.³ .......................... B23C 3/04; B23D 1/02
[52] U.S. Cl. .................................. 409/132; 409/199; 409/313; 376/142
[58] Field of Search .............. 29/456, 558; 51/95 LH, 51/165.71, 165.77; 408/35; 409/65–67, 73, 75, 76, 80, 131, 132, 138, 168, 199, 289, 291, 292, 293, 309, 313, 316, 319, 346; 376/142

[56] References Cited

U.S. PATENT DOCUMENTS

| | | | |
|---|---|---|---|
| 1,415,819 | 5/1922 | Estep | 409/292 |
| 2,015,919 | 11/1935 | Brunner | 409/346 |
| 3,370,491 | 2/1968 | Cross | 409/131 |
| 3,424,054 | 1/1969 | Cook et al. | 409/131 |
| 3,741,070 | 6/1973 | Berthiez | 409/132 |
| 4,028,992 | 6/1977 | Kuehnle | 409/199 |
| 4,031,809 | 6/1977 | Shraiman et al. | 409/132 |
| 4,145,954 | 3/1979 | Schilder | 409/199 |
| 4,231,694 | 11/1980 | Unigovsky et al. | 409/199 |
| 4,257,724 | 3/1980 | Blaimschein et al. | 409/199 |
| 4,359,303 | 11/1982 | Bragaglia | 409/319 |

Primary Examiner—Sal Cangialosi
Attorney, Agent, or Firm—Brown & Martin

[57] ABSTRACT

The inside, outside and opposite side surfaces of elongate, helical shaped, rectangular cross-section metal work pieces are individually close tolerance machined to produce finished conductor segments. These segments are connected end to end to form a helical coil which encircles a toroidal conducting shell of a fusion reactor. An apparatus is provided which may be fitted with corresponding tooling for separately machining the inside and outside surfaces of a work piece. The work piece is supported by the apparatus with the surface to be machined unobstructed. The unobstructed surface is cut in the poloidal direction as the work piece is moved in the toroidal direction. The side surfaces of the work piece are machined with a programmable, numerically controlled milling machine.

11 Claims, 21 Drawing Figures

METHOD AND APPARATUS FOR FABRICATING FUSION REACTOR COILS

BACKGROUND OF THE INVENTION

The present invention relates to the fabrication of large precision machined metal parts, and more particularly, to a method and apparatus for fabricating large copper segments of a helical coil which wraps around the toroidal conducting shell of a fusion reactor.

For many years there has been a worldwide effort toward the goal of harnessing fusion power as an inexhaustible source of energy for mankind. The basic fuel for atomic fusion is deuterium, an isotope of hydrogen that is easily and cheaply extracted from ordinary water. It is contemplated that deuterium extracted from sea water can supply human energy needs for billions of years at present rates of consumption. Atomic fusion is particularly desirable because it will have minimal environmental impact when compared with atomic fission. Although some radioactivity is generaged by the fusion process, the quantities and biological hazards are far less than those from other power sources, and in particular from atomic fission. In addition, problems of runaway, over-heating, or melt down reaction are virtually impossible in connection with atomic fusion.

Recently, Dr. Tihiro Ohkawa and his associates at General Atomic Company of San Diego, California, United States of America, have been developing a new magnetic fusion concept called Ohmic Heating Toroidal Experiment (OHTE). They have designed and constructed a prototype of a pilot fusion reactor to assess the physics and feasibility of a new plasma confinement concept.

The aforementioned OHTE reactor combines features from several other magnetic plasma confinement devices. It incorporates a large toroidal conducting shell like that utilized in reversed-field pinch systems. It also utilizes helical coils (H coils) similar to stellarator or torsatron windings. In addition, it incorporates an ohmic heating coil (E coil), vertical field coil (VF coil), and a plasma chamber similar to those of tokamak device.

In the OHTE reactor, the core is disposable in order to circumvent many material development problems for the first wall of the reactor. The device ignites with ohmic heating only. This obviates the need for the development of neutral beam or radio-frequency heating equipment. Since it does not require extremely high strength magnetic fields, the OHTE reactor does not utilize superconducting magnets.

The helical coil of the OHTE reactor must accommodate extremely high electric current levels. Therefore, it cannot be constructed by wrapping conventional copper cable around the toroidal conducting shell. This is because the magnetic fields surrounding the individual cables would tend to push the cables apart, thereby generating unacceptable mechanical stresses. Furthermore, conventional cable cannot be used for constructing the helical coil since the disposable core could not be readily removed and replaced.

The accurate placement of the center of the helical coil current relative to the plasma is an essential design requirement for the OHTE reactor. This requires close tolerance machining of the individual conductor segments of the helical coil, accurate location of the conductor segments on the toroidal conducting shell, and limited structural deflections of the helical coil during operation of the fusion reactor. Accordingly, the helical coil conductor segments must be fabricated from large pieces of hard copper. In addition, close tolerance machining of inside, outside and edge surfaces of the conductor segments is required. Close tolerance machining of conductor segment joint surfaces, ends, and bolt holes is also required.

Locating pins on the outer surface of the toroidal conducting shell are utilized to accurately locate each one of the conductor segments which make up the helical coil. Preferably, during operation of the fusion reactor, minimum deflection of the helical coil, for example less than one millimeter, occurs.

I have developed a novel method and apparatus for performing the close tolerance machining on the individual conductor segments which make up the helical coil of the OHTE fusion reactor.

SUMMARY OF THE INVENTION

The present invention provides a method and apparatus for fabricating large segments of a helical coil which wraps around the toroidal conducting shell of the fusion reactor. The inside, outside and opposite side surfaces of elongate, helical shaped, rectangular cross-section metal work pieces are individually close tolerance machined to produce finished conductor segments. After the machining of end surfaces and bolt holes, the segments are mounted about the conducting shell and are connected end to end to form the helical coil.

Forged plates of copper are formed which are solution annealed and quenched. Individual, slightly C-shaped pieces are cut from the plate and are formed into a generally helical shape in a press. The resulting work pieces are heated to increase strength and conductivity.

In the illustrated embodiments, an apparatus is provided which may be fitted with corresponding tooling for separately machining the inside and outside surfaces of a work piece. The apparatus includes a generally triangular shaped horizontal base plate and an overlying generally triangular shaped sector plate. The base plate is supported by a frame having leveling mechanisms for insuring that the upper surface of the base plate is flat. The base plate and sector plate are pivotally connected at their apexes so that the sector plate may be rotated horizontally relative to the base plate. The plates each have large arcuate apertures formed therein which remain radially aligned as the sector plate is rotated. A hydraulic piston and cylinder assembly is provided for generating rotation of the sector plate relative to the base plate. During the machining operations described hereafter, the sector plate is moved from a start position to a finish position and back again.

Special tooling can be detachably connected to the apparatus to configure it for machining the inside surface of the work piece. This tooling includes a generally helical shaped downwardly opening receptacle for receiving the work piece therein. The receptacle is mounted to the sector plate and is positioned over the aperture in the sector plate, in alignment therewith. A plurality of pressure bolts extending through the sides of the receptacle hold the work piece in position with its inside surface facing downwardly and unobstructed.

A cylindrical chuck is mounted within the apertures of the base and sector plates for rotation about a horizontal axis. The chuck has a plurality of circumferentially spaced bits which extend radially outwardly therefrom. The chuck is drivingly connected with a motor for generating powered rotation of the chuck.

In its inside surface cutting configuration, the work piece is mounted within the receptacle. The motor is energized to initiate powered rotation of the chuck. Hydraulic fluid is delivered to initiate rotation of the sector plate and the work piece carried thereby. The work piece is rotated over the chuck, and the bits of the chuck cut the inside surface of the work piece in the poloidal direction (minor circumference of toroid). This cutting action continues as the work piece is moved in the toroidal direction (major circumference of toroid). In this manner, the entire inside surface of the work piece is machined.

The apparatus may be refitted with different tooling to configure it for machining the outside surface of the work piece. In its outside surface cutting configuration, the apparatus is fitted with a ring-shaped chuck which is supported within the apertures formed in the base and sector plates. The ring-shaped chuck is supported for rotation about a horizontally extending axis by a special ring bearing structure. A plurality of circumferentially spaced cutting bits are mounted to the ring-shaped chuck and extend radially inwardly therefrom.

The ring-shaped chuck is drivingly connected with the electric motor to enable powered rotation of the chuck. Special tooling is provided for supporting the work piece with its outside surface facing upwardly and unobstructed so that it can be passed through the ring-shaped chuck. This tooling includes a toroidal segment which is mounted to the sector plate and is positioned over the aperture formed in the sector plate, in alignment therewith. Blocks and pressure bolts on the surface of the toroidal segment are utilized for releasably securing the partially finished work piece in position about the toroidal segment with its outside surface unobstructed.

The operation of the apparatus in its outside surface cutting configuration is as follows. With the partially finished work piece in position on the toroidal segment, powered rotation of the ring-shaped chuck is initiated. Thereafter, hydraulic fluid is delivered to the hydraulic piston and cylinder assembly to initiate powered rotation of the sector plate from its start position toward its finish position. The work piece begins to move in the toroidal direction since it is mounted on the toroidal segment which is connected to the sector plate. As the work piece passes through the ring-shaped chuck, the bits thereof cut the unobstructed outside surface of the work piece in the poloidal direction. As the sector plate moves completely through its feed cycle, the work piece is passed completely through the ring-shaped chuck in the toroidal direction. In this fashion, the work piece is provided with a machined outside surface along its entire length that conforms in shape to the surface of the toroidal conducting shell. A drill unit mounted on the base plate is used to drill and ream a hole in one end of the work piece which later becomes a locating groove.

After the work piece has had its inside and outside surfaces machined in the apparatus described above, the next step is to machine the side surfaces of the work piece. This may be done by utilizing a programmable, numerically controlled milling machine. The work piece is secured about another toroidal segment with one of its side surfaces unobstructed. This toroidal segment is mounted for rotation about an axis which extends longitudinally of the segment. A special cutting bit is operatively coupled to the milling machine. This bit has a plurality of radially extending, circumferentially spaced cutting edges having a rounded configuration. The numerical control which automatically guides the cutting bit is preprogrammed so that the cutting bit will move to cut a plurality of adjacent, helical extending grooves in the side surface of the work piece. These grooves collectively define the finished side surface of the resulting conductor segment. This cutting of the grooves takes place during selective powered rotation of the work piece.

The grooves that form the side surface of a finished conductor segment are separately cut, one after the other, by the rotating bit. In order to cut the grooves, the numerical control for the milling machine is preprogrammed in reference to the X, Y, and Z axes and the axis of rotation of the toroidal segment to which the work piece is secured. The work piece may thereafter be secured to the toroidal segment with its other side surface unobstructed so that it can be similarly machined. The same tooling may also be utilized for machining a flat joint surface, and a flat end surface on each end of the work piece.

The final step in the fabrication of the conductor segment is to drill a plurality of holes through the ends of the partially finished work piece. These holes receive the bolts which are used to connect a splice plate between one end of the conductor segment and the adjacent end of another conductor segment. The splice plate has a flat inside surface which overlies the flat joint surfaces on the ends of the conductor segments. The outside convex surface of the splice plate may be machined by utilizing the aforementioned apparatus in its outside surface cutting configuration. The side surfaces of the splice plate are machined in the same manner as the side surfaces of the work piece.

BRIEF DESCRIPTION OF THE DRAWINGS

FIG. 4 is a top plan view of an apparatus which may be utilized to machine the inside and outside surfaces of an elongate, helical shaped, rectangular cross-section metal work piece which is fabricated into a conductor segment. In FIG. 4, the apparatus has been fitted with special tooling for machining the inside surface of a work piece.

FIG. 5 is an enlarged frontal elevation view of the cylindrical chuck utilized in the apparatus of FIG. 4 in its inside surface cutting configuration.

DESCRIPTION OF THE PREFERRED EMBODIMENTS

Figure 1:
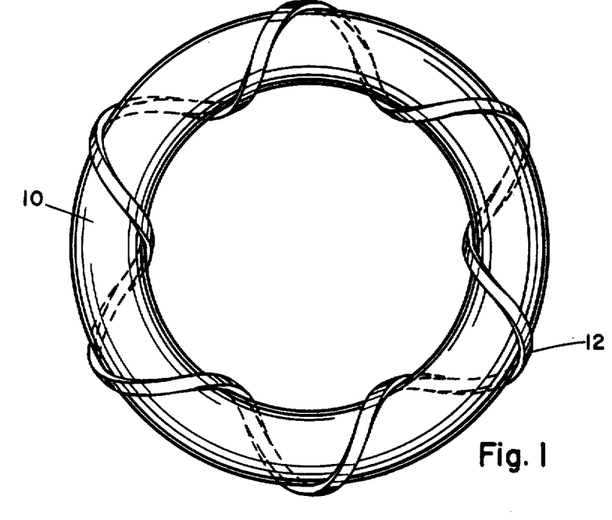
FIG. 1 is a simplified top plan view of a toroidal conducting shell of a fusion reactor with a helical coil encircling the same.
Figures 19, 20, 21:
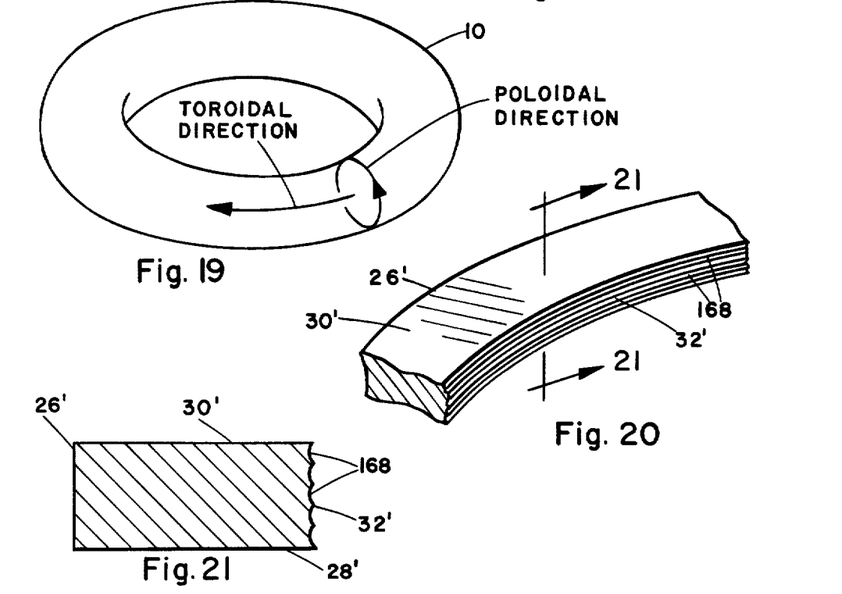
FIG. 19 is a simplified perspective view of the toroidal conducting shell of the fusion reactor illustrating the relationship of the poloidal and toroidal directions thereto.
FIG. 20 is an enlarged, elevation view of a portion of one of the partially finished work pieces illustrating the plurality of adjacent, helical extending grooves which are cut in the side surface thereof.
FIG. 21 is a vertical sectional view of the partially finished work piece of FIG. 20 taken along line 21—21 of FIG. 20.

FIG. 1 illustrates the toroidal conducting shell 10 of the OHTE fusion reactor. Wrapped around the conducting shell is a helical coil 12 which is made of a plurality of individual conductor segments 14 (FIG. 2) which are connected end to end. For the sake of simplicity, FIG. 1 illustrates only one helical coil which encircles the conducting shell six times in the poloidal (minor circumference) direction and which at the same time travels around the conducting shell once in the toroidal (major circumference) direction before closing on itself. FIG. 19 illustrates the relationship of the poloidal and toroidal directions to the toroidal conducting shell 10.

In the actual prototype of the OHTE fusion reactor, the helical coil is a pair of windings wrapped around the conducting shell. Each such winding encircles the shell in the poloidal direction sixteen times before closing on itself, and at the same time travels around the shell three times in the toroidal direction.

Figure 2:
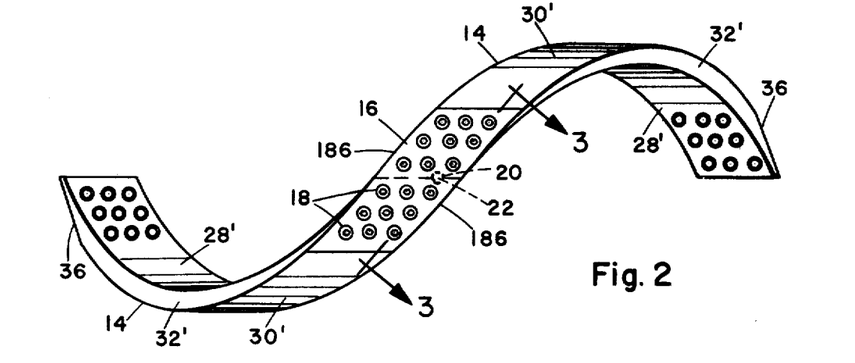
FIG. 2 is an enlarged side elevation view of a pair of conductor segments fabricated in accordance with the present invention which are connected end to end to construct the helical coil of FIG. 1.

The pitch of the helical coil 12 (FIG. 1), i.e., the number of times the coil encircles the conducting shell 12 in the poloidal direction as it travels around the shell once in the toroidal direction, is determined by the angle of the coil relative to toroidal direction. In FIG. 2, this angle is approximately forty-five degrees. In the prototype of the OHTE reactor, the helical coil consists of sixty-four separate conductor segments 14 (FIG. 2). The ends of the segments are connected at the horizontal midplane of the toroidal conducting shell 10 (FIG. 1) by splice plates 16 (FIG. 2). The splice plates are secured to adjacent ends of the conductor segments by a pattern of preloaded bolts 18.

The conductor segments are assembled around the conducting shell 10 (FIG. 1) to form the H coil 12. Insulation material such as that sold under the trademark KAPTON is used to isolate the shell from the individual conductor segments. The insulation material also provides the required separation between the shell and the coil.

Each of the conductor segments 14 has a precision half-round groove 20 (FIG. 17) on its outboard joint end. This groove engages a corresponding locating pin 22 (FIG. 2) mounted on the conducting shell. Once the conductor segments 14 have been positioned about the conducting shell and have been shimmed with a suitably thick layer of insulation material, the splice plates 16 are bolted in place. Each of the pins 22 accurately locates a pair of the conductor segments so that there is no tolerance buildup as the helical coil is assembled. The tolerance on each conductor segment is taken up at the inboard joint.

Figure 3:
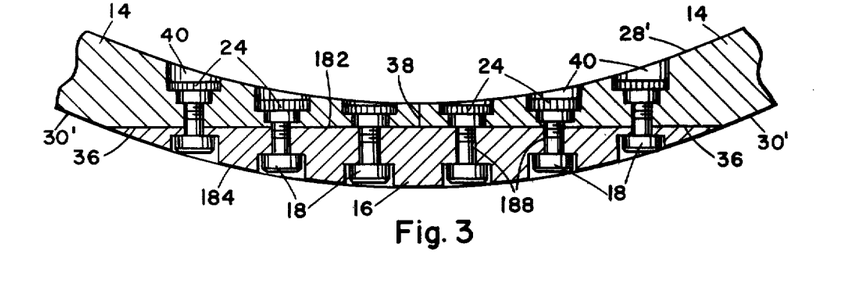
FIG. 3 is an enlarged sectional view taken along line 3—3 of FIG. 2 showing the manner in which a splice plate is utilized to connect the adjacent ends of a pair of conductor segments.

Referring to FIG. 3, each of the splice plates 16 is secured to adjacent ends of a pair of the conductor segments 14 by a pattern of preloaded bolts such as INCONEL 718 bolts. The clamping force on the joint surface is retained by a stack of four AISI 316 stainless steel BELLEVILLE disc springs (not shown) on each bolt. All joint surfaces are preferably silverplated. Each bolt 18 engages a beryllium copper threaded insert 24. The bolts 18 may be detached to disconnect the conductor segments 14. The segments can then be removed to permit the disposable reactor core to be replaced. The conductor segments can thereafter be repositioned about the conducting shell 10 and secured together with the splice plates 16 and the bolts 18.

As previously mentioned, in order to confine the plasma for sufficient periods of time, the accurate placement of the center of the helical coil current relative to the plasma is essential. This requires close tolerance machining of the individual conductor segments 14 (FIG. 2). This will insure proper geometry of the coil itself as well as the proper fit of the coil about the toroidal conducting shell. When the current through the helical coil is raised to its maximum level, additional structural supports of the reactor (not shown) limit deflection of the coil.

Because of the close tolerances required in the helical coil of the OHTE fusion reactor, warpage in the conductor segments during machining must be minimized or eliminated. It is not feasible to use annealed copper since the yield strength of the material would be exceeded at maximum coil current. In the prototype, the conductor segments were made of C18200 chrome copper available from AMPCO Metal Company. That metal is produced in the form of forged plates which are solution annealed and quenched. The plates are formed with the required thickness and length. Individual slightly C-shaped pieces are cut from the plate and are formed into a generally helical shape in a press. The copper work pieces are than aged at approximately 450° C. to increase strength and conductivity. The individual work pieces are then machined utilizing the method and apparatus of the present invention.

Figures 7, 8, 9:
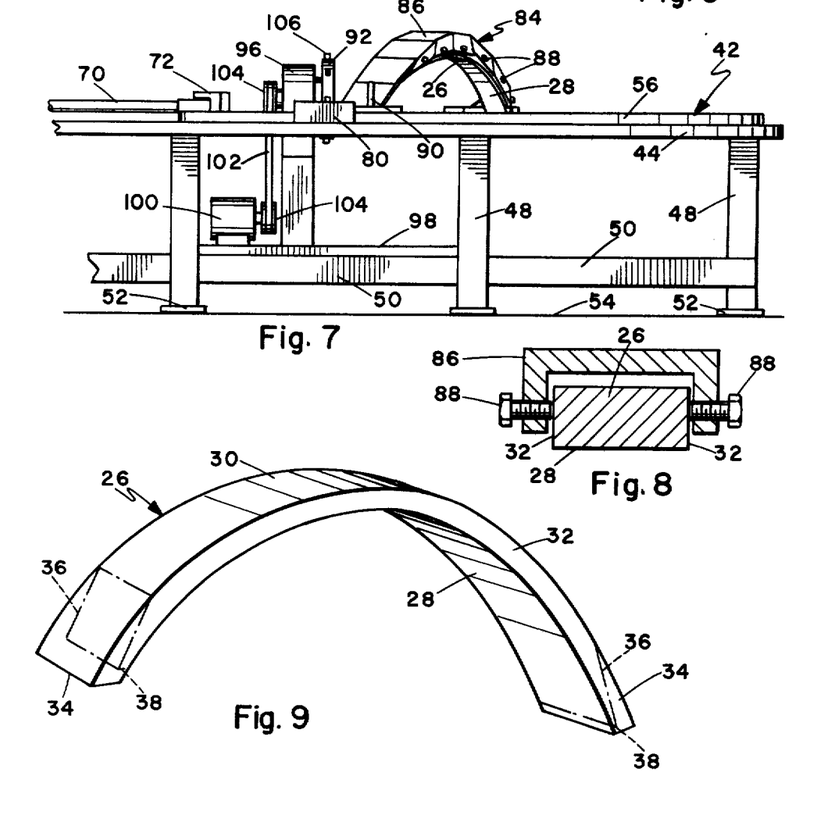
FIG. 7 is a partial side elevation view of the apparatus of FIG. 4 taken from the right hand side of FIG. 4.
FIG. 8 is an enlarged vertical sectional view taken along line 8—8 of FIG. 4 illustrating the manner in which a helical work piece may be releasably clamped inside a helical receptacle forming part of the tooling of the apparatus in its configuration shown in FIG. 4.
FIG. 9 is a perspective view of an elongate, generally helical shaped, rectangular cross-section work piece which is machined to produce one of the conductor segments which partially encircles the toroidal conducting shell of the fusion reactor.

FIG. 9 illustrates one of the work pieces 26 after it has been cut from the plate and bent to the approximate helical curvature required in the press. The work piece comprises an elongate, helical shaped rectangular cross-section hunk of metal. The work pieces that were fabricated into the conductor segments for the prototype OHTE reactor each weighed approximately 220 pounds. The inside and outside surfaces 28 and 30 of each work piece 26 are machined to produce the corresponding inside and outside surfaces 28' and 30' (FIG. 2) of the finished conductor segment 14. A hole is drilled through the outboard end of the work piece which will later define the locating groove. Thereafter, the opposite side surfaces 32 (FIG. 9) of the work piece 26 are machined to produce the side surfaces 32' (FIG. 2) of the finished conductor segment 14. Portions 34 (FIG. 9) are removed from opposite ends of the work piece 26 by machining to produce the flat joint surfaces 36 (FIGS. 2, 3 and 9) to which the corresponding splice plates 16 will be bolted in overlying relationship. The inner side of each splice plate is flat. The outer side of each splice plate is curved to smoothly and uniformly continue the outside surface 30' of one finished conductor segments 14 to the outside surface 30' of the adjacent conductor segment to which it is connected. The splice plates 16 are separately machined from suitably sized pieces of the same copper of which the conductor segments 14 are made.

After the joint surfaces 36 have been machined, the opposite ends of the work piece 26 are machined to produce flat end surfaces 38 (FIG. 3) which are perpendicular to the joint surfaces 36. This produces the locating groove 20 (FIG. 17) at the outboard end of the finished conductor segment. The flat end surfaces 38 of adjacent ends of each pair of conductor segments 14 abutt one another as shown in FIG. 3 when the corresponding splice plate 16 is bolted in position. The final machining step for each of the work pieces entails the drilling of a plurality of holes 40 (FIG. 3) required for the shanks of the bolts 18 and the threaded inserts 24.

Referring again to FIG. 1, the problem of machining the work pieces in order to produce conductor segments which can be connected to form the helical coil 12 is a task that involves substantial geometric considerations. The inside and outside surfaces 28' and 30' (FIG. 2) of each of the finished conductor segments 14 must conform in shape to the surface of the toroid 10 in a predetermined manner. Additionally, the side surfaces 32' of the conductor segments must conform to predetermined precise helical paths. It will be noted that the curvature of the inside and outside surfaces as well as that of the side surfaces changes from convex to concave and back again when transverse sections are taken through the coil 12 at various locations about the same.

FIGS. 4–8 and 10–14 illustrate a preferred embodiment of an apparatus 42 which may be utilized to machine the inside and outside surfaces of each work piece 26 (FIG. 9) so that they conform to the surface of the toroidal conducting shell 10 in a manner that will allow the finished conductor segment 14 (FIG. 2) to partially encircle the shell in both the poloidal and toroidal directions. The apparatus 42 may be set up in a first configuration shown in FIGS. 4, 6 and 7 for machining the inside surface of the work piece. The apparatus 42 may be set up in a second configuration shown in FIGS. 10 and 11 for machining the outside surface of the work piece.

The apparatus 42 includes a large, generally triangular shaped horizontal base plate 44 (FIG. 4) made of steel. The base plate is supported by a frame 46 (FIG. 6) made of steel box beams welded together. The frame includes a plurality of vertically extending legs 48 and a plurality of horizontally extending cross members 50. The bottom of each of the vertical legs 48 is provided with an elevator foot 52. Each of the elevator feet has an internal screw mechanism therein for adjusting the height of the leg to which it is attached. This permits the base plate 44 to be leveled if the floor 54 is unlevel or has any low spots.

The apparatus 42 further comprises a large, generally triangular shaped horizontal sector plate 56 (FIG. 4) which overlies the base plate 44. The sector plate is slightly smaller than the base plate. The apexes of the triangular shaped plates are pivotally connected by a bushing 58 (FIG. 6) which extends through aligned holes in the plates and which is held in position by a pair of end caps 60 and 62.

Figures 4, 5:
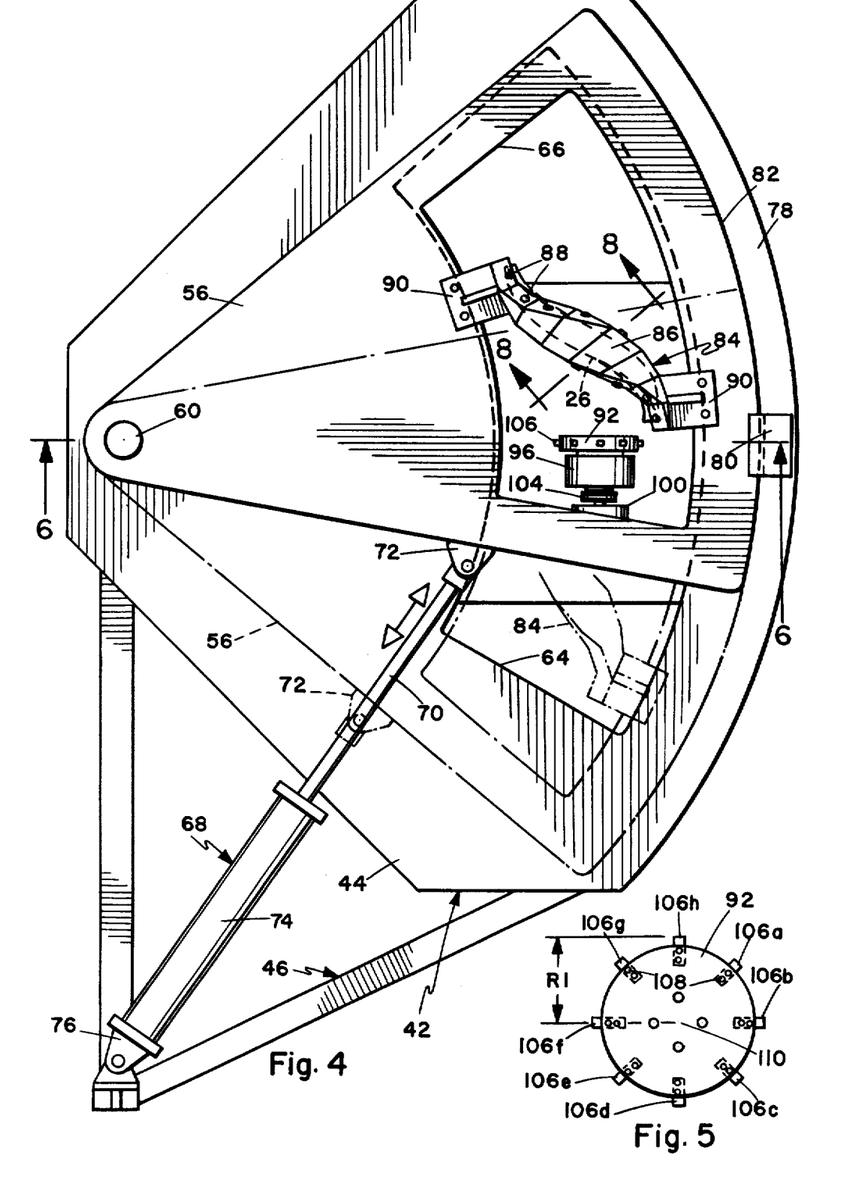

As shown in FIG. 4, the base plate 44 has a large arcuate first aperture 64 formed in its base portion. The overlying sector plate 56 has a similarly configured large arcuate second aperture 66 formed in its base portion. The first and second apertures have substantially the same width in the radial direction. The first aperture has a length in the circumferential direction which is considerably greater than that of the second aperture.

The plates 44 and 56 (FIG. 4) are pivotally connected so that the first and second apertures 64 and 66 are aligned, in other words, their arcuate edges extend substantially parallel to one another. The point of pivotal connection between the plates is chosen so that the large apertures in the plates remain radially aligned as the sector plate 56 is rotated between its start position shown in solid lines in FIG. 4 and its finish position shown in phantom lines in FIG. 4. A hydraulic piston and cylinder assembly 68 is provided for generating the aforementioned rotational movement between the plates. The piston rod 70 of the assembly has its remote end secured to one side edge of the sector plate 56 intermediate its length by a pivotal connector assembly 72. The cylinder 74 of the hydraulic assembly 68 has its base end secured to the frame 46 by a pivotal connector assembly 76.

During operation of the apparatus 42, the rate of delivery of hydraulic fluid under pressure to and from the cylinder 74 is precisely controlled through a valve not shown. The sector plate rotates from its start position shown in solid lines in FIG. 4, to its finish position shown in phantom lines and then back again to its start position. The stroke of the piston rod 70 thus determines the degree of rotation of the sector plate. As used herein, the term feed cycle refers to the powered rotation of the sector plate from its start position to its finish position. The term return cycle refers to the rotation of the sector plate from its finish position to its start position.

In order to insure accurate machining of each work piece with the apparatus 42 (FIG. 4), the upper surface of the base plate 44 and the lower surface of the sector plate 56 which engage each other must be flat. Accordingly, the plates may be made of steel plate which is approximately three inches thick. The plates are substantial in their planar dimensions. For example, the arcuate outer edge 78 of the base plate 44 measures approximately 20 feet. The large plates have a tendency to deform under their own weight. Therefore, the leveling feet 52 (FIG. 6) are adjusted to raise or lower the vertical legs 48 of the frame as required to insure that the base plate upper surface approaches perfect flatness. The frame 46 does not contain any diagonal cross members. This permits independent relative movement of the spaced vertical legs 48. The legs are moved up or down only a few thousandths of an inch.

The apparatus 42 is further provided with a guide element 80 (FIGS. 4 and 6) whose base is rigidly secured to the outer periphery of the base plate 44, intermediate the length of the outer edge 78 thereof. The guide element 80 has its base secured to the base plate 44 beyond the outer curved edge 82 of the sector plate 56. The upper portion of the guide element has a flange which overlaps the periphery of the sector plate 56 to prevent the plate from moving upwardly away from the base plate during the machining operations hereafter described.

Special tooling can be detachably connected to the components of the apparatus 42 described above to configure the apparatus for machining the inside surface of a work piece 26. This tooling includes a generally helical shaped downwardly opening receptacle 84 (FIGS. 4, 6 and 7) for receiving the work piece 26 therein. As shown in FIG. 8, the receptacle 84 comprises a plurality of box-like segments 86 welded together in end to end fashion. Each of the boxes 86 is twisted slightly with respect to the proceeding box to follow the helical shape of the work piece. Means are provided for releasably securing the work piece 26 in the receptacle 84 with the inside surface 28 of the work piece facing downwardly and unobstructed as best shown in FIGS. 7 and 8. Specifically, a plurality of pressure bolts 88 have their shanks threadably engaged in holes through the opposite sides of each of the box-like segments 86. The ends of the shanks of the bolts engage the opposite side surfaces 32 of the work piece 26 to rigidly hold the work piece in precise position.

The opposite ends of the helical receptacle 84 (FIG. 4) are welded to the inner ends of corresponding horizontal connector plates 90. The outer ends of these plates are bolted to the sector plate 56 on opposite sides of its second aperture 66. The helical receptacle and the work piece carried thereby are thus aligned with the second aperture.

A cylindrical chuck 92 (FIGS. 4 and 5) is rotatably mounted in position within the first and second apertures of the base plate 44 and sector plate 56, respectively. The chuck 92 is rigidly mounted on one end of a horizontal axle 94 (FIG. 6) which is journaled within bearings contained within the upper end of an upright support housing 96 (FIG. 7). The lower end of the support housing 96 is rigidly secured to a horizontal motor platform 98 bolted to a pair of the cross members 50 of the frame of the apparatus. An electric motor 100 (FIG. 7) mounted on the platform 98 is drivingly interconnected with the chuck 92. An endless belt 102 is entrained around a pair of pulleys 104 rigidly secured to the motor shaft and the other end of the axle 94 which carries the chuck.

As shown in FIG. 5, the chuck 92 has a plurality of circumferentially spaced cutting bits 106a-106h mounted thereto. These bits extend radially outwardly from the cylindrical chuck and are removably held in the chuck by pairs of screws 108. The cutting bits 106a-106h extend progressively further moving circumferentially about the chuck 92. This is not visible in FIG. 5. Specifically, a first one of the bits a extends radially a predetermined minimum distance from the central axis 110 of the chuck. Moving clockwise about the chuck, the next cutting bit 106b extends radially from the chuck slightly further than the preceding cutting bit 106a. In the prototype of the apparatus 42 that has been constructed, the outer end of the cutting bit 106b extends radially from the central axis 110 of the chuck approximately one-sixteenth of an inch farther than the outer end of the cutting bit 106a. The next cutting bit 106c extends radially approximately one-sixteenth of an inch farther than the proceeding bit 106b and so forth. The last one 106h of the cutting bits extends radially the greatest distance from the central axis 110. It makes the cut which defines the final machined surface 28' (FIG. 2).

Figure 6:
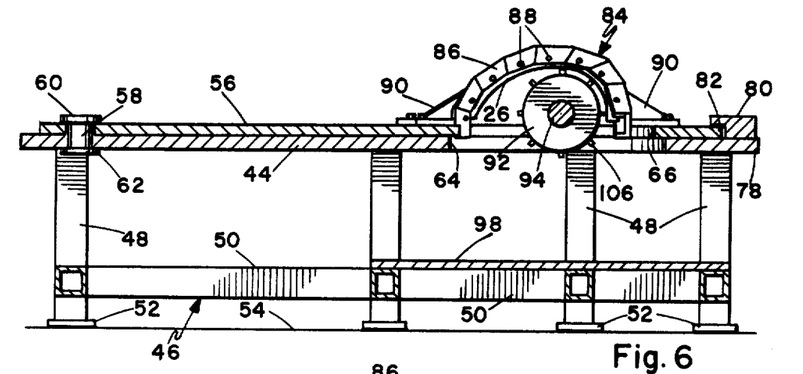
FIG. 6 is a vertical sectional view of the apparatus of FIG. 4 taken along line 6-6 of FIG. 4.

In its configuration shown in FIGS. 4, 6 and 7, the apparatus 42 may be utilized for performing the precision machining of the inside surfaces of the work pieces 26. Each of the work pieces is mounted within the helical receptacle 84 when the sector plate 56 is in its start position shown in solid lines in FIG. 4. The pressure bolts 88 are tightened to hold the work piece in the precise required alignment. The motor 100 (FIG. 7) is energized to initiate powered rotation of the chuck 92. Hydraulic fluid is then delivered under pressure to the cylinder 74 (FIG. 4) to rotate the sector plate at a very slow controlled rate, for example, at ten inches per minute. The sector plate 56 is rotated very slowly from its start position shown in solid lines in FIG. 4 to its finish position as shown in phantom lines in FIG. 4. The work piece is thus moved in the toroidal direction past the rotating chuck 92 which is supported in a fixed position. Each of the bits cuts the inside surface of the work piece in the poloidal direction as the work piece is moved over the chuck in the toroidal direction. The chuck 92 is rotated in a direction opposite to the direction around the chuck in which the bits extend progressively further. The cutting bits thus peel away excess copper from the work piece, each bit cutting progressively deeper than the preceeding bit.

The distance R1 (FIG. 5) between the remote end of the longest cutting bit 106h and the central axis 110 of the chuck is slightly larger than the radius of the minor circumference of the toroidal conducting shell. The slight difference is to permit the insulating layer to be placed between the outer surface of the conducting shell and the inside surface of the conductor segment. The machining of the inside surface of the work piece carried in the receptacle 84 proceeds very slowly from the lower end of the work piece 26 in FIG. 4 to the upper end of the work piece. During the cutting of the inside surface by the bits 106a-106h, the guide element 80 (FIGS. 4 and 6) holds down the sector plate 56. It prevents the work piece from riding upwardly away from the bits which would otherwise cause inaccuracies in the dimensions of the machined inside surface. The sector plate 56 eventually arrives at its finish position shown in phantom lines at FIG. 4. At this time helical receptacle 84 carrying the work piece arrives at its position shown in phantom lines in that figure.

It will be observed that the radial position of the receptacle 84 (FIG. 4) and that of the work piece carried thereby must be precisely set relative to the rotational axis between the sector plate 56 and the base plate 44 represented by the bushing 58 (FIG. 6). In effect, the work piece must be moved along a curved path so that its resulting machined inside surface precisely encircles and conforms to an imaginary segment of the surface of the toroidal conducting shell during the rotation of the sector plate and the base plate. Therefore, when the apparatus 42 is configured for machining the inside surfaces of the work pieces, the positioning and alignment of the required tooling, including the support housing 96, the chuck 92, and the helical receptacle 84 must be very carefully established and monitored throughout the machining operation. Furthermore, each work piece must be very precisely positioned within the helical receptacle 84.

Figure 10:
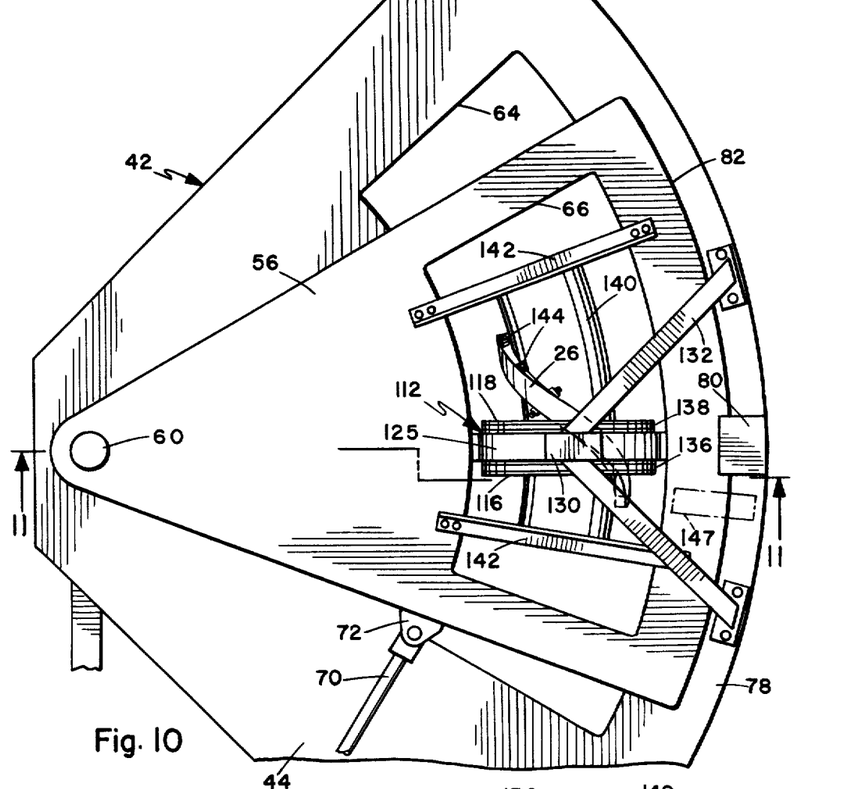
FIG. 10 is a partial top plan view of the apparatus of FIG. 4 fitted with special tooling for cutting the outside surface of a work piece.
Figure 11:
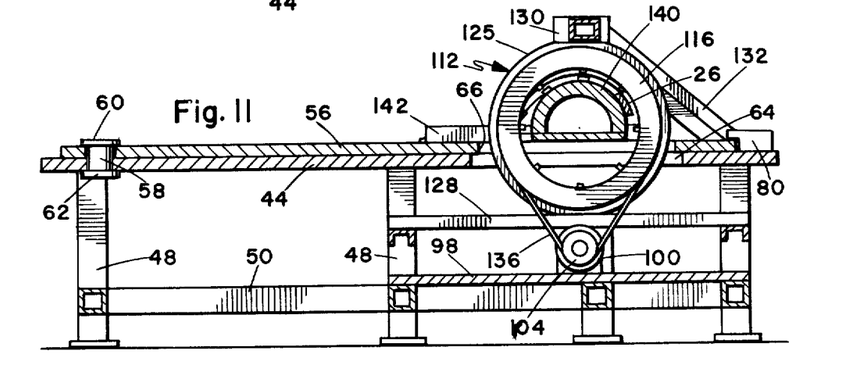
FIG. 11 is a vertical sectional view of the apparatus of FIG. 10 taken along line 11—11 of FIG. 10 showing additional details of the outside surface cutting configuration of the apparatus.

Once the inside surfaces of all of the work pieces have been machined, the apparatus 42 may be refitted with different tooling to configure it as shown in FIGS. 10 and 11 for machining the outside surfaces 30 (FIG. 9) of each of the work pieces. This is done to form the finished outside surfaces 30' of the conductor segments 14 (FIG. 2). In this configuration, the apparatus 42 is fitted with a ring-shaped chuck 112, (FIGS. 10, 11, 12 and 13).

Figure 12:
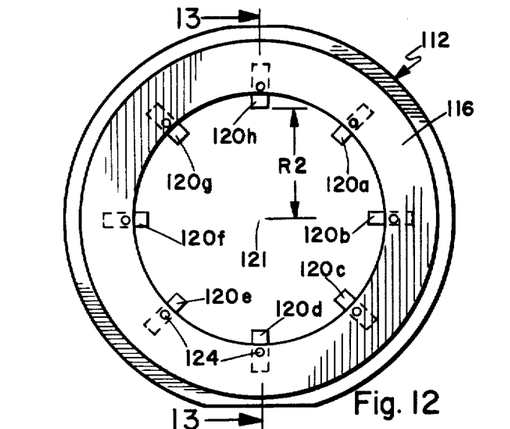
FIG. 12 is an enlarged frontal elevation view of a ring-shaped chuck and bearing structure which forms part of the special tooling for the apparatus of FIG. 10.
Figure 13:
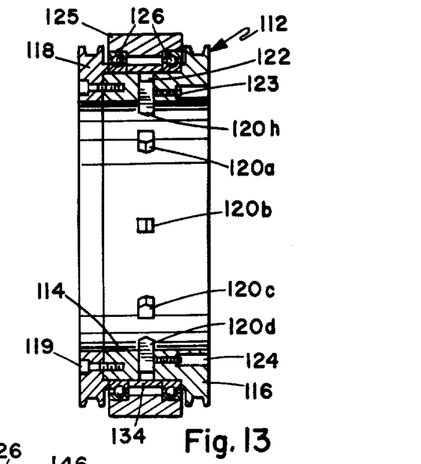
FIG. 13 is a vertical sectional view of the ring-shaped chuck and bearing structure taken along line 13—13 of FIG. 12.

The chuck 112 (FIGS. 10 and 11) is supported in position within the first and second apertures 64 and 66 of the base and sector plates 44 and 56, respectively. As shown in FIG. 13, the ring-shaped chuck 112 includes a central cylindrical portion 114 having a first pulley 116 integrally formed on one end thereof. The chuck 112 also includes a separate second pulley 118 concentrically secured to the other end of the cylinder portion 114 by a plurality of circumferentially spaced bolts 119 (not illustrated in FIG. 12). The pieces 114, 116 and 118 which make up the chuck 112 have an inside diameter which is sufficiently large to permit a work piece 26 to be moved therethrough. A plurality of circumferentially spaced cutting bits 120a-120h are mounted to the ring-shaped chuck and extend radially inwardly therefrom.

The bits 120a-120h (FIG. 12) extend progressively further moving circumferentially about the ring-shaped chuck 112. In other words, the bit 120b extends radially inwardly slightly further, e.g., one-sixteenth of an inch, then the preceeding bit 120a and so forth around the chuck in the clockwise direction in FIG. 12. The bit 120h extends radially inwardly the greatest distance of all the bits. The distance R2 between the cutting end of the bit 120h and the central axis 121 of the chuck determines the radius of the finished outside surface 30' (FIG. 2) of the conductor segments 4. As previously mentioned, the outside surface of each of the conductor segments conforms in shape to the outside surface of the toroidal conducting shell 10 (FIG. 1) about which the conductor segments are to be mounted. In FIG. 12, the progressive extension of the bits is not visible since it is relatively small in comparison with the size of the bits and the diameter of the chuck.

Each of these cutting bits is slidably received in a corresponding inwardly opening slot 122 (FIG. 13) formed in the central portion 114 of the chuck. The bits are held in position in the slots by screws 123 engaged in the threaded inner portions of holes 124 extending axially through the pulley 116 and the central portion 114 of the chuck.

Means are provided for supporting the ring-shaped chuck 112 for rotation so that the work piece carried by the sector plate 56 can be moved through the central opening of the chuck and its bits will cut the unobstructed outside surface of the work piece in the poloidal direction. Specifically, as shown in FIG. 13, the central cylindrical portion 114 of the chuck is surrounded by a fixed annular collar 125. A pair of ring bearings 126 are mounted between the portion 114 of the chuck and the collar 125. The lower outer portion of the collar 125 is rigidly secured to a cross member 128 (FIG. 11) of the frame 46. The upper outer portion of the collar 125 is rigidly secured to an apex assembly 130 (FIGS. 10 and 11) of an inclined A-frame 132 (FIG. 10). The diverging legs of the A-frame prevent the chuck 112 from moving up or down in FIG. 10 as a result of the forces generated by moving the workpiece through the chuck.

An annular spacer 134 (FIG. 13) surrounds the chuck central portion 114 and spaces apart the inner races of the ring bearings 126. The outer races of the ring bearings 126 are rigidly secured in corresponding annular grooves formed in the inner surface of the collar 125. The twin ring bearings 126 permit the chuck 112 to freely rotate, while accurately holding its center of rotation fixed during the inside surface cutting operation. The lower ends of the legs of the A-frame 132 are bolted to the peripheral edge portion of the base plate 44, beyond the outer edge 82 of the sector plate 56.

The electric motor 100 (FIG. 11) mounted on the motor platform 98 is drivingly connected with the ring-shaped chuck 112. Endless belts 136 and 138 are entrained about the pulley 104 on the motor shaft and about corresponding ones of the pulleys 116 and 118 of the chuck. The chuck is thus given a balanced drive on both sides of the ring bearings 126. The motor 100 can be energized to provide powered rotation of the chuck 112.

Special tooling is provided for supporting a work piece with its outside surface 30 (FIG. 9) unobstructed so that it can be passed through the ring-shaped chuck 112 as shown in FIG. 11. Specifically, this tooling includes a toroidal segment 140 (FIG. 10) having minor and major circumference radii substantially equal to that of the toroidal conducting shell 10 (FIG. 1) about which the work piece is to partially encircle after it has been machined. A pair of L-shaped crossbeams 142 are rigidly secured to opposite ends of the toroidal segment 140. The ends of the crossbeams 142 are bolted to the sector plate 56 on opposite sides of the aperture 66 formed therein. The toroidal segment 140 is thus aligned with the second aperture 66.

Figure 14:
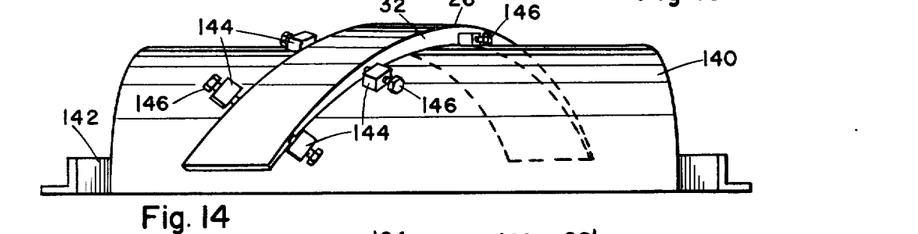
FIG. 14 is an enlarged elevation view of a toroidal segment which forms part of the special tooling of the apparatus in its outside surface cutting configuration of FIG. 10. A work piece is shown releasably clamped to the toroidal segment.

Means are provided for releasably securing the work piece 26 to the toroidal segment 140 so that the work piece partially encircles the toroidal segment with its outside unmachined surface facing upwardly and unobstructed. Specifically, as shown in FIG. 14, a plurality of blocks 144 are rigidly secured to the surface of the toroidal segment 140. A work piece 26 which partially encircles the toroidal segment 140 as shown is positioned between opposing pairs of the blocks. The blocks 144 are sufficiently small so that they leave a substantial amount of the outside portion of the work piece unobstructed. Each of the blocks has the shank of a corresponding pressure bolt 146 threadably engaged with a hole through the block. The bolts 146 can be screwed inwardly so that the ends of their shanks will abut the opposite unfinished side surfaces 32 of the work piece 26 to rigidly hold the work piece in position.

The operation of the apparatus 42 in its outside surface machining configuration can now be described. With the sector plate 56 in its start position (shown in solid lines in FIG. 4), a work piece 26 whose inside surface has already been machined is mounted about the toroidal segment 140 as shown in FIG. 14. The work piece is very precisely positioned between the blocks 144 both laterally and longitudinally. When the work piece has been correctly aligned, the pressure bolts 146 are all tightened in order to rigidly maintain the precise required position. Next, the electric motor 100 (FIG. 11) is energized to initiate powered rotation of the ring-shaped chuck 112. Hydraulic fluid under pressure is supplied to the cylinder 74 (FIG. 4) to cause the sector plate 56 to slowly rotate downwardly in FIG. 10 toward its finish position shown in phantom lines in FIG. 4. As the work piece 26 passes through the ring-shaped chuck (FIGS. 10 and 11), the bits 120a–120h thereof cut the unobstructed outside surface of the work piece in the poloidal direction. The ring-shaped chuck 112 is rotated so that the longer bits follow the shorter bits in their cutting action. Since each of the cutting bits extends progressively further than the preceeding bit, each peels off a layer of copper. The final bit 120h provides the finish cut.

It will be noted that the radial position of the toroidal segment 140 (FIG. 10) relative to the rotational axis defined by the bushing 58 (FIG. 11) connecting the base plate 44 and the sector plate 56 must be precisely set. This insures that the outside surface of the work piece 26 will be provided with a curved machined surface having the correct shape that conforms to the shape of the surface of the conducting shell 10 (FIG. 1).

As the sector plate 56 (FIG. 10) moves completely through its feed cycle, the work piece 26 will be passed completely through the ring-shaped chuck 112. Thus, the work piece 26 will be provided with a machined outside surface along its entire length that conforms in shape to the surface of the toroidal conducting shell 10 (FIG. 1).

Before the work piece is removed from around the toroidal segment 140 (FIG. 10), a drill unit 147 is detachably mounted to the base plate 44. It is used for drilling a hole in what will be the outboard end of the finished conductor segment. This hole will later become the locating groove 20 when the end of the conductor segment is machined to leave half of the hole. The drill unit 147 has a motor, a chuck, and a guide bushing for receiving first a drill bit and then a reamer. These details are not visible in FIG. 10. The axis of the drill bit is precisely pointed toward the central axis of the bushing 58 (FIG. 11) and extends through the midplane of the imaginary toroid defined by the toroidal segment 140.

After each of the work pieces has had its outside surface machined in the apparatus 42 as configured in FIGS. 10 and 11, and a hole drilled in its outboard end, the next step is to machine the side surfaces 32 (FIG. 9) thereof. This may be done with a programmable, numerically controlled milling machine. In the actual fabrication of conductor segments for the prototype OHTE fusion reactor described above, a milling system utilized was a combination of an ACROLOCK (trademark) milling machine manufactured by Bayer, Industries of Phoenix, Arizona, United States of America and a GN C SERIES (trademark) programmable digital control manufactured by General Numeric of Chicago, Illinois, United States of America.

Figure 15:
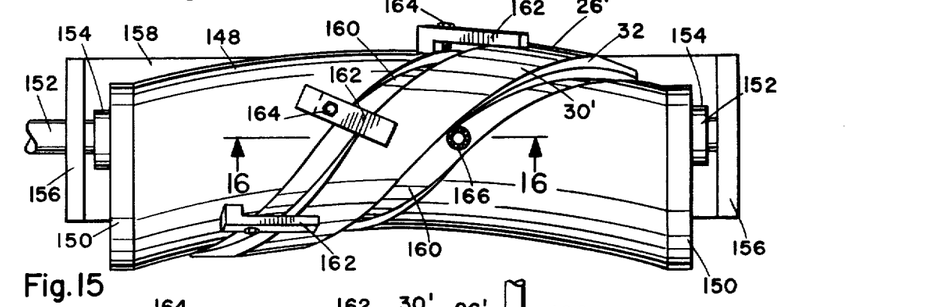
FIG. 15 is a top plan view of another toroidal segment to which a partially finished work piece may be releasably clamped so that its side surfaces can be machined.

Special tooling is required to accomplish the machining of the side surfaces of each of the work pieces. Specifically, another toroidal segment 148 (FIG. 15) is provided for supporting each of the work pieces for rotation about a horizontal axis extending longitudinally of the work piece. The minor and major radii of the toroidal segment 148 are substantially equal to that of the conducting shell 10 (FIG. 1). The opposite ends of the toroidal segment 149 (FIG. 15) are fitted with corresponding end caps 150. A pair of stub shafts 152 have their inner ends rigidly secured in corresponding collars 154 secured to the plates 150. The stub shafts 152 are each journaled in bearing plates 156 whose lower ends are welded to a support plate 158. The outer end of the left one of the stub shafts 152 in FIG. 15 is coupled to drive mechanisms not shown for selective powered rotation of the toroidal segment 148 and the work piece 26 carried thereby.

Figure 16:
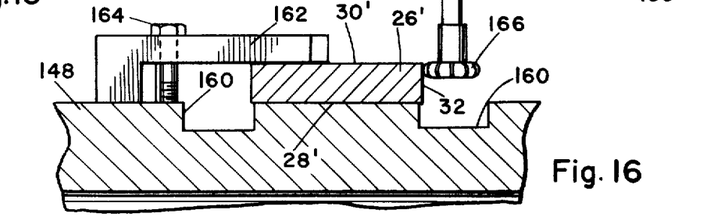
FIG. 16 is an enlarged sectional view taken along line 16—16 of FIG. 15 illustrating the manner in which the side surfaces of a partially finished work piece are machined.

As shown in FIG. 16, the surface of the toroidal segment 148 is formed with a pair of parallel helical grooves 160 between which is positioned a partially finished work piece 26'. The inside and outside surfaces 28' and 30' have previously been machined with the apparatus 42. Means are provided for releasably clamping the partially finished work piece 26' to the toroidal segment 148 with one of the unmachined side surfaces 32 of the work piece unobstructed. A plurality of L-shaped clamp members 162 (FIG. 15) are secured to the toroidal segment 148 by corresponding pressure bolts 164 adjacent to, and spaced along, one of the helical grooves 160. One leg of each of the L-shaped clamp members 162 extends across and abuts the machined outside surface 30' of the partially finished work piece 26'. The pressure bolts 164 are tightened to securely hold the partially finished work piece 26' in position.

In order to machine the side edges 32 of the work piece, a special cutting bit 166 (FIG. 16) is operatively coupled to the milling machine (not shown). This bit has a plurality of radially extending, circumferentially spaced cutting edges having a rounded configuration. The numerical control which automatically guides the cutting bit 166 is preprogrammed so that the cutting bit will cut a plurality of adjacent, helical extending grooves 168 (FIGS. 20 and 21) in the side surface of the work piece 26' in order to form the machined side surface 32'. These grooves are not visible in FIG. 2.

The side surface of each work piece changes in shape from convex to concave and back to convex again. Therefore, it would be difficult to accurately machine the finished side surface 32' as flat surface while still following the required accurate helical paths for the side surfaces. The side surfaces must be close tolerance machined to insure accurate placement of the center of the H coil current relative to the plasma to be confined within the toroidal conducting shell.

The grooves 168 (FIGS. 20 and 21) are separately cut, one after another, by the rotating bit 166 (FIG. 16). In order to cut the grooves 168, the numerical control for the milling machine must be programmed in reference to the X axis, the Y axis, the Z axis and the axis of rotation of the toroidal segment 148 to which the work piece is secured. The numerical control must control the movement of the cutting bit 166 along the X, Y and Z axes as well as the rotation of the toroidal segment 148 according to a carefully preprogrammed relationship.

All of the partially finished work pieces 26' have one of their side surfaces machined utilizing the tooling shown in FIGS. 15 and 16 and the numerically controlled milling machine. Thereafter, each of the partially finished work pieces is mounted on tooling similar to that shown in FIG. 15 so that each partially finished work piece 26' will have its remaining unfinished side surface 32 unobstructed. One by one the partially finished work pieces 26' have their unfinished side surfaces 32 machined as described above utilizing the numerically controlled milling apparatus.

The inside and outside surfaces 28' and 30' (FIG. 2) and the opposite side surfaces 32' of each of the work pieces have now been machined. The next step is to mill the end surfaces of each one of the work pieces. This may be accomplished by mounting each of the work pieces on the toroidal segment 148 (FIG. 15) and by utilizing the numerically controlled milling machine. The flat joint surfaces 36 and the flat end surfaces 38 (FIG. 17) at the ends of each of the work pieces are milled. This defines the locating groove 20 at the outboard end of each conductor segment.

Figures 17, 18:
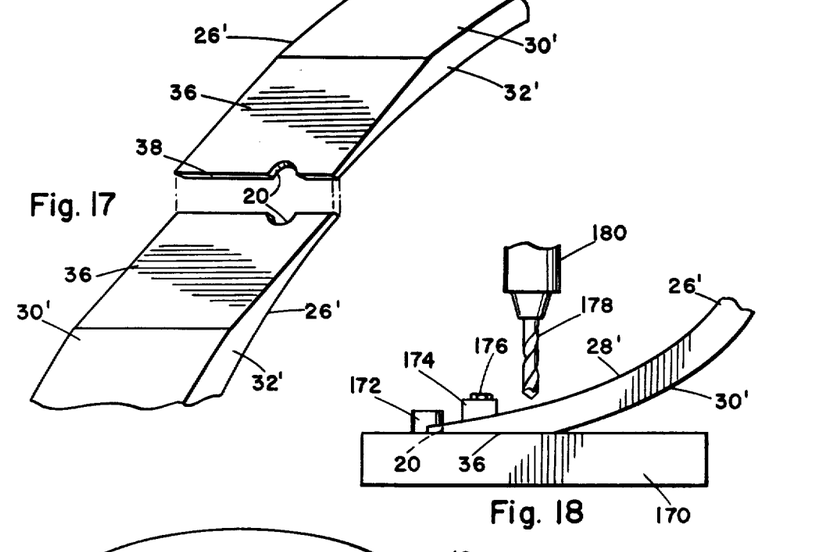
FIG. 17 is an enlarged, fragmentary view of the abutting ends of a pair of partially finished work pieces illustrating the flat joint surfaces and locating grooves which are machined therein.
FIG. 18 is a side elevation view of a partially finished work piece with one of its ends clamped to a block to permit the drilling of the holes required for the bolts which hold the corresponding splice plate in place.

The final step in the fabrication of the conductor segments 14 is to drill the holes 40 (FIG. 3) therethrough which receive the threaded inserts 24 and the shanks of the bolts 18. Each end of each partially completed work piece 26' is positioned with its flat joint surface 36 in overlapping, abutting relationship with the upper flat surface of a support block 170 (FIG. 18). A vertically extending locating pin 172 is rigidly secured to the upper surface of the block 170 adjacent one end thereof. The work piece 26' is situated on the upper surface of the block 170 so that the pin 172 is snuggly received in the locating groove 20 in the end of the work piece. This arrangement is utilized for uniformly positioning the ends of each of the work pieces for drilling the holes 40 in their proper locations. An L-shaped clamping member 174 has one leg with a curved under surface adapted to overlap a portion of the finished inside surface 28' of the work piece 26'. The clamping member 174 is squeezed against the work piece by tightening a bolt 176 whose shank extends through the clamping member and is threadably engaged with a hole in the block 170. A drill bit 178 carried by a drill chuck 180 of a drill press (not shown) is utilized for drilling the smallest inside diameter portions of each of the holes 40. Larger drill bits are then used to drill the larger portions of the holes 40.

The splice plates 16 (FIG. 3) are fabricated from appropriately sized rectangular pieces of the same copper metal of which the conductor segments 14 are fabricated. The inside surface 182 of each of the splice plate need not be machined since it overlaps and engages the adjacent joint surfaces 36 of a connected pair of conductor segments 14. The curved outside surface 184 of each of the splice plates 16 is machined by utilizing the apparatus 42 configured with the ring-shaped chuck 112. Appropriate tooling not shown is utilized for holding each of the splice plate work pieces in the appropriate position with its outside surface unobstructed. As the splice plate is moved through the chuck 112, the bits thereof cut the unobstructed outside surface to form the finish machined surface 184 whose curvature forms a continuation of the finished outside surfaces 30' (FIG. 3) of the adjacent pair of conductor segments 14 which it connects. The side surfaces 186 of each of the splice plates 16 are machined by mounting each partially finished splice plate on the toroidal segment 148 (FIG. 15).

The numerically controlled milling machine is then utilized to cut a plurality of helical extending grooves therein such as the grooves 168 (FIG. 21) cut in the work pieces 26'. The holes 188 (FIG. 3) in each of the splice plates 16 which receive the bolts 18 are drilled utilizing a procedure similar to that discussed in conjunction with FIG. 18.

Having described preferred embodiments of my method and apparatus for fabricating fusion reactor coils, it should be apparent to those skilled in the art that my invention permits of modification in both arrangement and detail. For example, the method and apparatus of the present invention can be utilized to machine the segments of the toroidal conducting shell 10 (FIG. 1). Therefore, the protection afforded my invention should be limited only in accordance with the scope of the following claims.

I claim:

1. An apparatus for machining the inside and outside surfaces of an elongate, generally helical shaped, rectangular cross-section metal work piece so that the surfaces conform in shape to the surface of a toroid which the finished work piece is to partially encircle in both the poloidal and toroidal directions, comprising:
   means for supporting the work piece so that at least one of its inside and outside surfaces is unobstructed;
   means for cutting the unobstructed surface of the work piece in the poloidal direction; and
   means for generating relative movement in the toroidal direction between the supporting means and the cutting means so that the unobstructed surface of the work piece will be provided with a machined surface along its entire length that conforms in shape to the surface of the toroid.

2. An apparatus according to claim 1 wherein the cutting means includes:
   a generally cylindrical chuck;
   a plurality of circumferentially spaced bits mounted to the chuck and extending radially outwardly therefrom;
   means for supporting the chuck for rotation so that when the work piece is supported with its inside surface unobstructed, the bits will cut the unobstructed inside surface in the poloidal direction; and
   means for providing powered rotation of the chuck.

3. An apparatus according to claim 1 wherein the cutting means includes:
   a ring-shaped chuck;
   a plurality of circumferentially spaced bits mounted to the chuck and extending radially inwardly therefrom;
   means for supporting the chuck for rotation so that when the work piece is supported with its outside surface unobstructed, the bits will cut the unobstructed outside surface in the poloidal direction; and
   means for providing powered rotation of the chuck.

4. An apparatus according to claims 2 or 3 wherein the bits extend progressively further moving circumferentially about the chuck.

5. An apparatus according to claim 2 wherein the work piece supporting means includes:
   a frame;
   a horizontal base plate supported by the frame having a first arcuate aperture formed therein, the chuck supporting means positioning the cylindrical chuck in the first aperture;

a horizontal sector plate overlying the base plate and having a second arcuate aperture formed therein aligned with the first aperture;

a generally helical shaped downwardly opening receptacle for receiving the work piece therein;

means for mounting the receptacle over the second aperture and in alignment therewith;

means for releasably securing the work piece in the receptacle with its inside surface facing downwardly and unobstructed; and means for pivotally connecting the base plate and the sector plate to permit the sector plate to be horizontally rotated relative to the base plate to move the entire work piece in the toroidal direction past the chuck so that the bits will cut the inside surface of the work piece and provide it with a machined surface along its entire length that conforms in shape to the surface of the toroid.

6. An apparatus according to claim 3 wherein the work piece supporting means includes:

a frame;

a horizontal base plate supported by the frame having a first arcuate aperture formed therein, the chuck supporting means positioning the ring-shaped chuck in the first aperture;

a horizontal sector plate overlying the base plate and having a second arcuate aperture formed therein aligned with the first aperture;

a toroidal segment having minor and major circumference radii substantially equal to that of the toroid which the finished work piece is to partially encircle;

means for mounting the toroidal segment over the second aperture and in alignment therewith;

means for releasably securing the work piece to the toroidal segment so that the work piece partially encircles the toroidal segment with the outside surface of the work piece facing upwardly and unobstructed; and means for pivotally connecting the base plate and the sector plate to permit the sector plate to be horizontally rotated relative to the base plate to move the entire work piece in the toroidal direction through the ring-shaped chuck so that the bits will cut the outside surface of the work piece and provide it with a machined surface along its entire length that conforms in shape to the surface of the toroid.

7. An apparatus according to claims 5 or 6 wherein the means for generating relative movement between the work piece supporting means and the cutting means includes:

a hydraulic piston and cylinder assembly;

means for pivotally connecting a first end of the hydraulic piston and cylinder assembly to the sector plate;

and means for pivotally connecting a second end of the hydraulic piston and cylinder assembly to the frame.

8. A method for machining at least one of the inside and outside surfaces of an elongate, generally helical shaped, rectangular cross-section metal work piece which is to partially encircle a toroid in both the poloidal and toroidal directions when finished, the method comprising the steps of:

supporting the work piece with the one surface unobstructed;

moving the work piece in the toroidal direction; and cutting the entire unobstructed surface of the work piece in the poloidal direction while the work piece is moving in the toroidal direction.

9. A method for machining the surfaces of an elongate, generally helical shaped, rectangular cross-section metal work piece which is to partially encircle a toroid in both the poloidal and toroidal direction when finished, the work piece having an inside surface, an outside surface, and a pair of opposite side surfaces, the method comprising the step of:

supporting the work piece with its inside surface unobstructed;

moving the work piece in the toroidal direction;

cutting the entire inside surface of the work piece in the poloidal direction while the work piece is moving in the toroidal direction;

supporting the work piece with its outside surface unobstructed;

moving the work piece in the toroidal direction; and cutting the entire outside surface of the work piece in the poloidal direction while the work piece is moving in the toroidal direction.

10. A method according to claim 9 and further comprising the steps of:

supporting the work piece with one of its side surfaces unobstructed for rotation about an axis extending longitudinally of the work piece; and cutting the one side surface with a rotating bit by controlling the movement of the bit along the X, Y and Z axes and the rotation of the work piece according to a predetermined relationship.

11. A method according to claim 9 wherein the cutting of the one side surface forms a plurality of adjacent, helical extending grooves in the one side surface.

* * * * *